(12) United States Patent
Vranish (10) Patent No.: US 7,207,245 B1
(45) Date of Patent: Apr. 24, 2007

(54) SCREW-LOCKING WRENCH (75) Inventor: John M. Vranish, Crofton, MD (US)

(73) Assignee: United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 11/174,454

(22) Filed: Jun. 30, 2005

(51) Int. Cl.
*B25B 13/04* (2006.01)
*F16D 13/00* (2006.01)

(52) U.S. Cl. .............................. 81/121.1; 81/58; 192/46

(58) Field of Classification Search ............... 81/121.1, 81/58, 58.3; 192/45.1, 46
See application file for complete search history.

(56) References Cited

U.S. PATENT DOCUMENTS

| | | | | |
|---|---|---|---|---|
| 3,534,836 | A | * | 10/1970 | Dane ......................... 192/43.1 |
| 5,174,772 | A | * | 12/1992 | Vranish ....................... 439/131 |
| 5,482,144 | A | * | 1/1996 | Vranish ...................... 188/82.8 |
| 5,518,094 | A | * | 5/1996 | Myrick ....................... 192/45.1 |
| 5,738,472 | A | * | 4/1998 | Roopnarine et al. ......... 411/309 |
| 6,082,512 | A | * | 7/2000 | Marks .......................... 192/43 |
| 6,584,874 | B1 | * | 7/2003 | Wade et al. .................... 81/60 |

* cited by examiner

Primary Examiner—David B. Thomas
(74) Attorney, Agent, or Firm—Bryan A. Geurts (57) ABSTRACT

A tool comprises a first handle and a second handle, each handle extending from a gripping end portion to a working end portion, the first handle having first screw threads disposed circumferentially about an inner portion of a first through-hole at the working end portion thereof, the second handle having second screw threads disposed circumferentially about an inner portion of a second through-hole at the working end portion thereof, the first and second respective through-holes being disposed concentrically about a common axis of the working end portions. First and second screw locks preferably are disposed concentrically with the first and second respective through-holes, the first screw lock having a plurality of locking/unlocking screw threads for engaging the first screw threads of the first handle, the second screw lock having a plurality of locking/unlocking screw threads for engaging the second screw threads of the second handle. A locking clutch drive, disposed concentrically with the first and second respective through-holes, engages the first screw lock and the second screw lock. The first handle and the second handle are selectively operable at their gripping end portions by a user using a single hand to activate the first and second screw locks to lock the locking clutch drive for either clockwise rotation about the common axis, or counter-clockwise rotation about the common axis, or to release the locking clutch drive so that the handles can be rotated together about the common axis either the clockwise or counter-clockwise direction without rotation of the locking clutch drive.

16 Claims, 7 Drawing Sheets

SCREW-LOCKING WRENCH

ORIGIN OF THE INVENTION

The invention described herein was made by an employee of the United States Government, and may be manufactured and used by or for the Government for governmental purposes without the payment of any royalties thereon or therefor.

TECHNICAL FIELD

The invention relates to the field of tools, and in particular to a wrench designed for astronaut use in servicing missions in outer space, for example, and/or for general use in tight spaces, where an inexpensive wrench of relatively simple construction is desirable.

BACKGROUND OF THE INVENTION

Recently, astronauts have had to perform a variety of servicing missions in outer space, such as repairing the Hubble Space Telescope. As is well known, astronauts are required to wear cumbersome gloves for protection from the harsh conditions experienced in outer space. Also, astronauts are very often required to work in the very confined spaces of existing spacecraft and space stations. Acquiring tools, in particular wrenches, suitable for use on these outer space missions is a problem.

One-way ratchet wrenches and one-way sprag ratchetless wrenches are known tools. However, the known one-way ratchet wrenches have a backlash/dead zone region and are limited for operation in small spaces. Also, they require a switching system for changing direction. The known one-way sprag ratchetless wrenches reduce the backlash/dead zone region, but have load bearing limitations, are relatively complicated in their sprag preload/switching schemes and construction, requiring a switch to change direction.

These characteristics of the known tools make them less than ideal for use by astronauts on servicing missions in outer space.

Some background material relating to sprags, screws and flexures applied to friction control includes the following four U.S. patents, the contents of which are hereby incorporated by reference in their entirety: Vranish, J. M., *Three-Dimensional Roller Locking Sprags*, U.S. Pat. No. 5,482,144, Jan. 9, 1996; Roopnarine, Vranish, J. M., Modified Locking Thread Form For Fastener, U.S. Pat. No. 5,738,472 Apr. 14, 1998; Myrick, Thomas, Vranish, J. M., *Clutch/Brake Having Rectangular-Area-Contact 3D Locking Sprags*, U.S. Pat. No. 5,518,094, May 21, 1996; and Vranish, J. M., *Workpiece Attachment Mechanism/Workpiece Attachment Fixture*, U.S. Pat. No. 5,174,772, Dec. 29, 1992. So-called 3-D sprag ratchetless wrenches are also known tools.

There is currently a demand in the industry for compact, low-cost ratchetless wrenches which can operate in tight spaces and which can reverse direction without reorienting or switching the tool.

Therefore, a need exists for a simple, reliable and compact ratchetless wrench which is specifically designed to overcome the problems and limitations inherent in the known wrenches, and that is, in particular, well suited for astronaut use in servicing missions in outer space and other operations in confined spaces.

SUMMARY OF INVENTION

The present invention advantageously provides a ratchetless wrench that is suitable for use by astronauts on outer space missions, and in particular, that can operate with negligible backlash, that is simple in construction and operation, that can withstand exceptional loads, and that is very compact. Further, the wrench has been designed to use known flight proven technology. For example, various steels, as well as crews, nuts and dry lubes that do not outgas, have been proven in outer space.

Some features of the invention believed to be new include the screw locking principle of operation, the screw-locking principle applied to ratchetless wrenches, a split-handled approach to ratchetless wrenches, and a double-round staggered handle configuration to permit one-handed lock/unlock operation.

Although the invention is specifically intended to be suitable for use by astronauts operating in outer space, the wrench according to the invention has the potential to become a dominant tool for everyday consumer and industrial use. There is currently a demand in industry for compact low cost ratchetless wrenches which can operate in tight spaces (hence the ratchetless feature) and which do not require switching.

According to an embodiment of the invention, a tool comprises a first handle and a second handle, each handle extending from a gripping end portion to a working end portion, the first handle having first screw threads disposed circumferentially about an inner portion of a first through-hole at the working end portion thereof, the second handle having second screw threads disposed circumferentially about an inner portion of a second through-hole at the working end portion thereof, the first and second respective through holes being disposed concentrically about a common axis of the working end portions. A first screw lock and a second screw lock are disposed concentrically with the first and second respective through holes, the first screw lock having a plurality of locking/unlocking screw threads for engaging the first screw threads of the first handle, the second screw lock having a plurality of locking/unlocking screw threads for engaging the second screw threads of the second handle. A locking clutch drive is disposed concentrically to the first and second respective through holes, which engages the first screw lock and the second screw lock.

In another embodiment, the first handle and the second handle are selectively operable at their gripping end portions by a user using a single hand to activate the first and second screw locks to lock the locking clutch drive for either clockwise rotation about the common axis of their working end portions, or counter-clockwise rotation about the common axis of their working end portions, or to release the locking clutch drive so that the handles can be rotated together about the common axis of their working end portions in either the clockwise or counter-clockwise direction without rotation of the locking clutch drive.

In yet another embodiment, the tool further comprises a preload spring disposed between the first and second handles between the gripping end portions and the working end portions. The first and second handles each have a preload spring pocket for receiving the preload spring therein. The preload spring applies an equal and opposite force to the first and second handles, the force applied to the first handle being in a clockwise direction with respect to the common axis of the working ends, and the force applied to the second handle being in a counter-clockwise direction with respect to the common axis of the working ends. The force applied to the first and second handles urges the first and second screw locks into contact with the locking clutch drive by urging the respective first and second screw threads of the first and second handles against the plurality of locking/unlocking screw threads of the first and second screw locks, respectively, so that the first and second screw locks are urged into contact with the locking clutch drive.

In yet another embodiment, the tool further comprises a drive member disposed on the locking clutch drive for providing output from the wrench to a fastener. The drive member may be a hexagonal drive member for providing output from the wrench to a hexagonal fastener and the tool may be a ratchetless wrench. However, the invention is not limited to a hexagonal shaped drive member, as any shape other than round will work, e.g., square, spline, etc.

In yet another embodiment, the user selectively operates the first handle and the second handle by holding the handles at their gripping end portions using a single hand, and applying a rotational torque to one or the other, or both of the handles.

In yet another embodiment, the first and second screw locks are threaded into the first and second screw threads of the first and second handles, respectively.

In yet another embodiment, the first screw lock has a plurality of spline passages and the second screw lock has a plurality of splines, the splines of the second screw lock fitting into the spline passages of the first screw lock so that the first and second screw locks cannot rotate with respect to each other.

In yet another embodiment, a spline washer is disposed coaxially with and between the first screw lock and the second screw lock. The first screw lock, the second screw lock and the spline washer rotate together as a unit. However, the first screw lock and the second screw lock can move axially with respect to each other. The spline washer keeps the handles from rubbing together and unlocking each other. The spline washer rotates with the clutches.

In yet another embodiment, the first clutch has spline passages and the second clutch has splines, which fit into the spline passages of the first clutch so that the first clutch and the second clutch cannot rotate with respect to each other.

In yet another embodiment, the locking clutch drive comprises a first clutch, which engages the first screw lock and is disposed coaxially therewith, and a second clutch which engages the second screw lock and is disposed coaxially therewith. The drive member is disposed on the second clutch coaxially with the second clutch.

In yet another embodiment, an assembly screw having assembly screw threads is provided. The first clutch preferably has an axially disposed screw passageway for receiving the assembly screw therethrough. The second clutch preferably has threads which engage the assembly screw threads of the assembly screw. The assembly screw preferably extends axially through the first clutch and into the second clutch so that the assembly screw threads of the assembly screw engage with the threads of the second clutch.

In yet another embodiment, the second clutch threads, which engage the assembly screw threads of the assembly screw are disposed on the splines of the second clutch.

In yet another embodiment, the assembly screw further comprises a screw head, the first clutch has an axially disposed screw head seat for seating the screw head of the assembly screw, and the assembly screw extends axially through the first clutch and into the second clutch so that the screw head of the assembly screw is seated on the screw head seat.

In yet another embodiment, the first handle comprises a first locking force reaction bushing and the second handle comprises a second locking force reaction bushing. The reaction bushing of the first handle and the reaction bushing of the second handle are disposed coaxially with respect to each other and with respect to the spline washer. The reaction bushings are disposed to contact opposite sides of the spline washer, thereby sandwiching the spline washer therebetween and allowing the first handle and the second handle to rotate independently from each other with respect to the common axis of their working end portions.

In yet another embodiment, the locking clutch drive has a central cylindrical section and first and second annular sections disposed coaxially at opposite ends of the cylindrical section. Each of the first and second screw locks have a respective cylindrical section disposed around an outside surface of the locking clutch drive central cylindrical section in close proximity thereto, and a respective annular section disposed to extend in close proximity to a respective annular section of the locking clutch drive. The respective annular sections of the first and second screw locks are disposed to extend in close proximity to a respective annular section of the locking clutch drive, each including a respective high friction, low wear surface portion for contact with a respective clutch wear surface of the locking clutch drive annular sections. The spline washer is disposed around the outside surface of the cylindrical section of the locking clutch drive between the first and second screw locks, and all surfaces of the spline washer are dry lubricated, as are the surfaces of the first and second screw locks, which are in close proximity to the locking clutch drive central cylindrical section.

In yet another embodiment, the first handle and the second handle gripping end portions each have a cross section in the shape of a circle with a triangular extension. The handles are disposed so that the triangular extension of the first handle and the triangular extension of the second handle are disposed to have corresponding sides which extend in opposite directions, such that when the first handle and the second handle are rotated in opposite directions with respect to the common axis of their working end portions, respective opposing surfaces of the respective triangular extensions move in close proximity in opposing parallel circular directions.

In yet another embodiment, a user selectively operates the first handle and the second handle by holding the handles at their gripping end portions using a single hand, and applying a rotational torque to one or the other, or both, of the handles.

These and other aspects, objects and advantages of embodiments of the invention will become apparent from the detailed description set forth below.

BRIEF DESCRIPTION OF DRAWINGS

FIG. 1 illustrate a screw-locking wrench working end assembly according to an embodiment of the invention. In particular, FIG. 1a illustrates a section A—A, and FIG. 1b illustrates a section B—B. A side-view illustration of the working end assembly portion is depicted in FIG. 1c.

FIG. 2 illustrate a screw-locking wrench handle assembly according to an embodiment of the invention. In particular.

FIG. 3 illustrate an upper handle assembly according to an embodiment of the invention. In particular.

FIG. 4 illustrate a lower handle assembly according to an embodiment of the invention. In particular.

FIG. 5 illustrate views of screw locks and spline washers according to an embodiment of the invention. In particular.

FIG. 6 illustrate views of a locking clutch, according to an embodiment of the invention. In particular.

FIG. 7 illustrate ramp locking and wedge drive according to an embodiment of the invention. In particular.

DETAILED DESCRIPTION OF THE INVENTION

The invention will now be described in more detail by way of example with reference to the embodiment(s) shown in the accompanying figures. It should be kept in mind that the following described embodiments are only presented by way of example and should not be construed as limiting the inventive concept to any particular physical configuration.

Figures 1A, 1B, 1C:
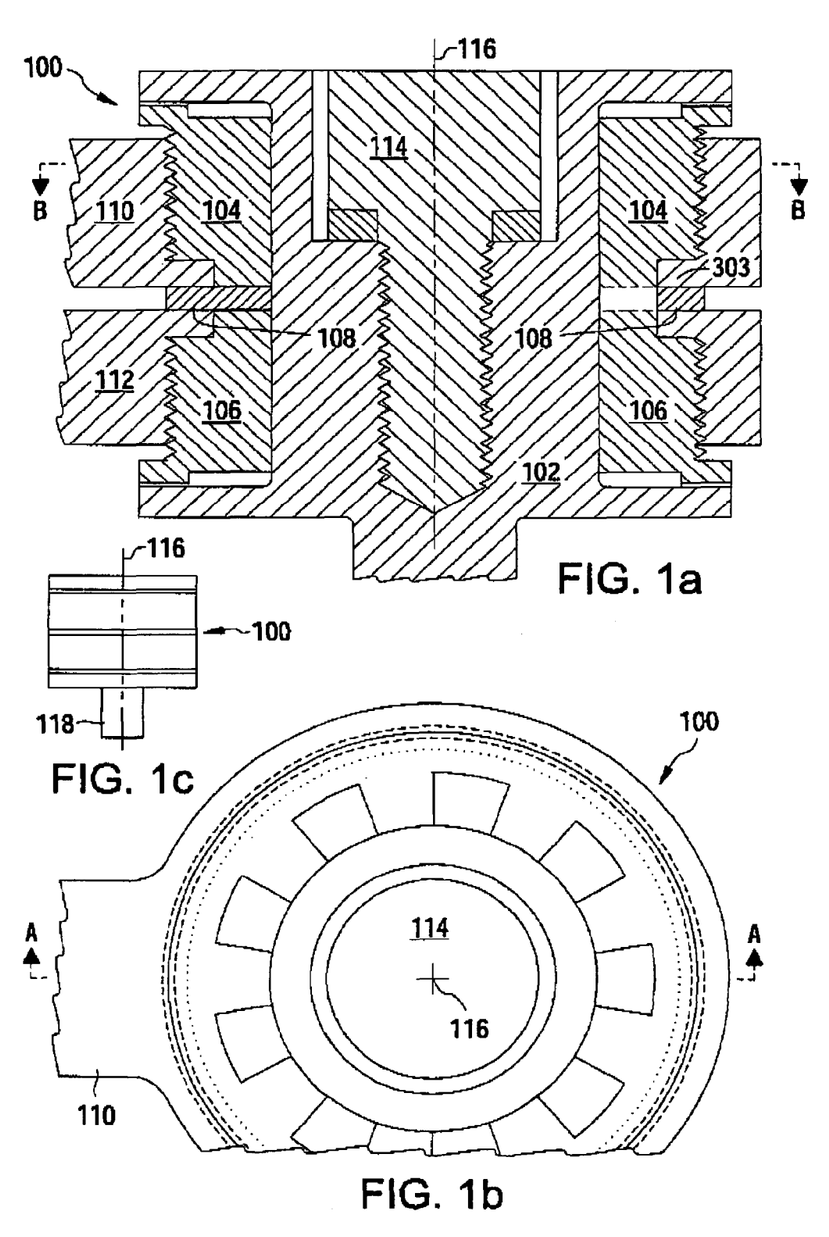

FIG. 1 illustrates a screw-locking wrench working end assembly according to an embodiment of the invention. In particular, FIG. 1a illustrates a section A—A, and FIG. 1b illustrates a section B—B. An exemplary illustration of the working end assembly portion is depicted in FIG. 1c With reference to the cross section of FIG. 1a, the working end assembly 100 comprises a locking clutch drive 102, which is centrally disposed. The locking clutch drive 102 has an upper and a lower clutch, as will be explained later with respect to FIG. 6. Surrounding the central cylindrical portion of the locking clutch drive 102 are upper 104 and lower 106 screw locks. The screw locks 104 and 106 have high friction/low wear surfaces which contact corresponding surfaces of the locking clutch drive 102. A lubed spline washer 108 is disposed between the upper and lower screw locks 104 and 106.

End portions of the upper 110 and lower 112 screw-locking wrench handles are shown at the left side of FIG. 1a. The upper and lower screw locks 104 and 106 are threaded with locking/unlocking screw thread, and these thread into threaded portions of the upper and lower handles 110 and 112, respectively, as is shown.

An assembly screw 114 is also shown in cross section extending through the top of the locking clutch drive 102 (the upper clutch) and into a threaded portion thereof (the lower clutch), thereby holding the assembly 100 together.

As can be seen in FIGS. 1a and 1b, the working end assembly 100 is generally circular when viewed from the top, and the components, assembly screw 114, locking clutch drive 102, lubed spline washer 108, and the upper 104 and lower 106 screw locks, are disposed about a common central axis 116. A drive member 118 (shown in FIG. 1c), for driving a fastener, is disposed along this central axis 116, as well.

Figures 2A, 2B:
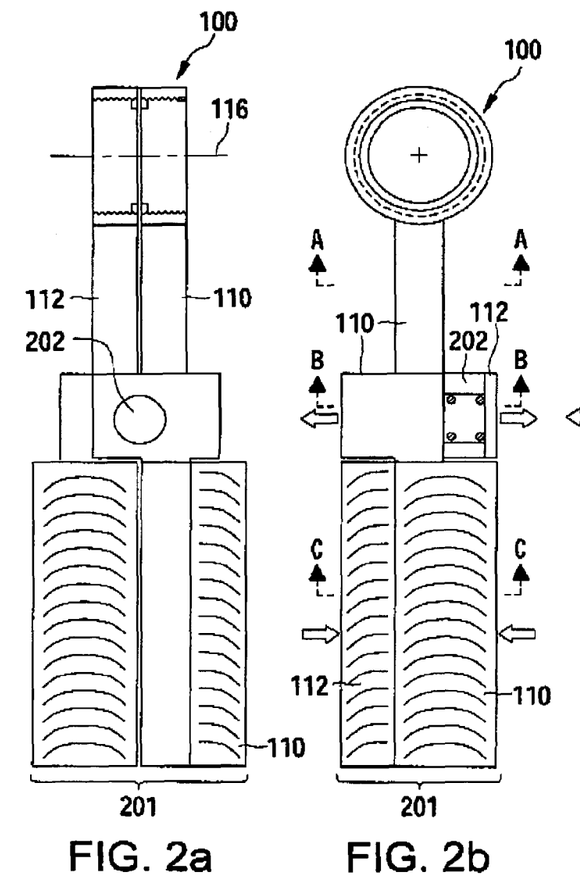
FIG. 2a illustrates a left side view.
FIG. 2b illustrates a top view.
Figure 2C:
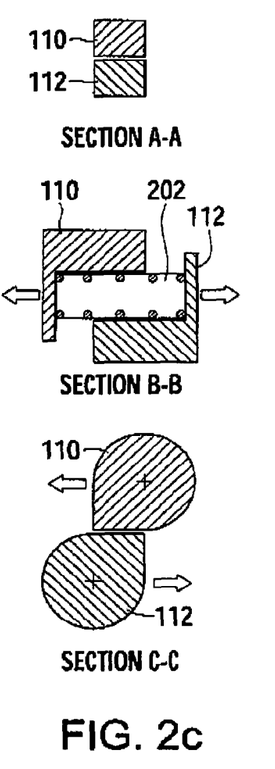
FIG. 2c illustrates three sections taken along the handle in FIG. 2b at A—A, B—B, and C—C.
Figure 3A:
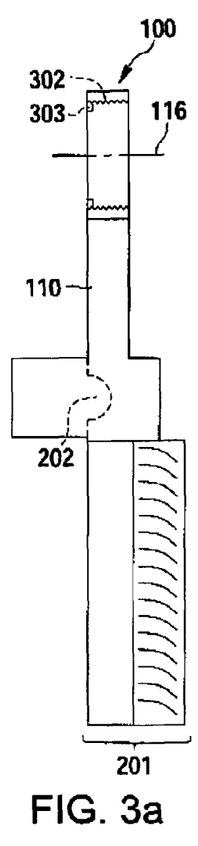
FIG. 3a illustrates a left side view.
Figure 3B:
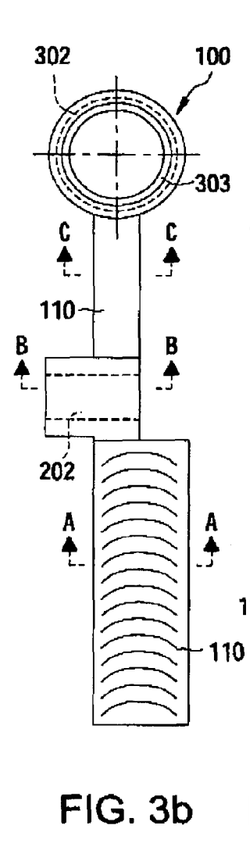
FIG. 3b illustrates a top view.
Figure 3C:
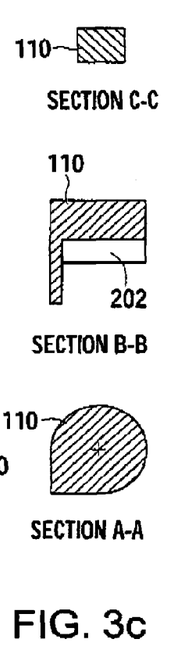
FIG. 3c illustrates three sections taken along the handle in FIG. 3b at A—A, B—B, and C—C.
Figure 3D:
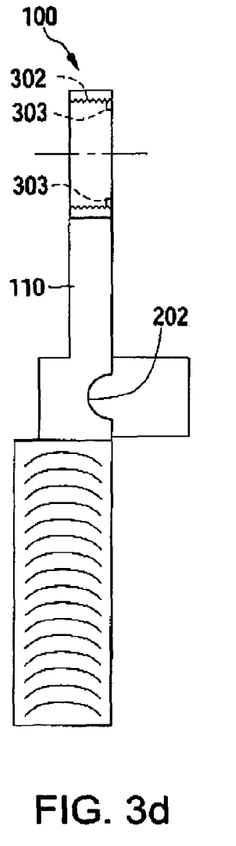
FIG. 3d illustrates a right side view.

FIG. 2 illustrate a screw-locking wrench handle assembly according to an embodiment of the invention. In particular, FIG. 2a illustrates a left side view, FIG. 2b illustrates a top view, and FIG. 2c illustrates three sections taken along the handle in FIG. 2b at A—A, B—B, and C—C.

FIG. 2 show how the upper 110 and lower 112 handles are positioned with respect to each other, and the working end assembly 100. Around the middle of the handles 110 and 112, between a gripping end 201 and the working end 100, there is a preload spring pocket or recess 202 for holding a preload spring (not shown). The arrows in the vicinity of the preload spring pocket 202 represent the direction of force to lock the wrench, which is also the direction that the preload spring urges the upper 110 and lower 112 handles.

The gripping end 201 of the handles 110,112 is shown in cross section taken along C—C, in FIG. 2c at the bottom. Each handle gripping end 201 has the cross section of a circle with a triangular extension. The handles 110,112 are disposed so that the triangular extension of the upper handle 110 and the triangular extension of the lower handle 112 are disposed to have corresponding sides which extend in opposite directions, such that when the upper handle 110 and the lower handle 112 are rotated in opposite directions with respect to the common axis 116 of their working end portions 100, e.g., in the direction of the arrows, respective opposing surfaces of the respective triangular extensions move in close proximity in opposite parallel circular directions, as can be seen.

FIG. 3 illustrate an upper handle assembly according to an embodiment of the invention. In particular, FIG. 3a illustrates a left side view, FIG. 3b illustrates a top view, FIG. 3c illustrates three sections taken along the handle in FIG. 3b at A—A, B—B, and C—C, and FIG. 3d illustrates a right side view.

FIG. 3 shows upper handle 110 in detail. As shown in FIGS. 3b and 3d, screw threads 302, preferably engage the upper handle 110 with the upper screw lock 104 is labeled. An upper locking force reaction bushing 303 will be explained in more detail below.

Figures 4A, 4B:
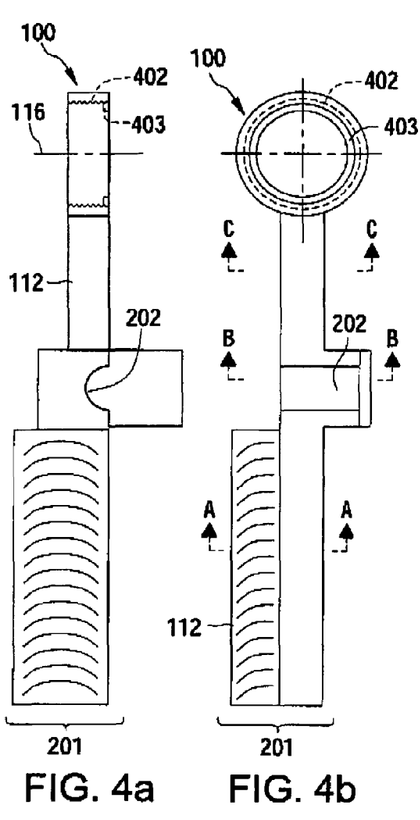
FIG. 4a illustrates a left side view.
FIG. 4b illustrates a top view.
Figure 4C:
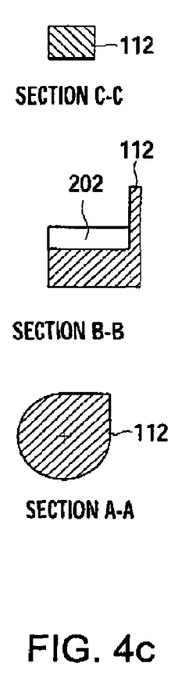
FIG. 4c illustrates three sections taken along the handle in FIG. 4b at A—A, B—B, and C—C.
Figure 4D:
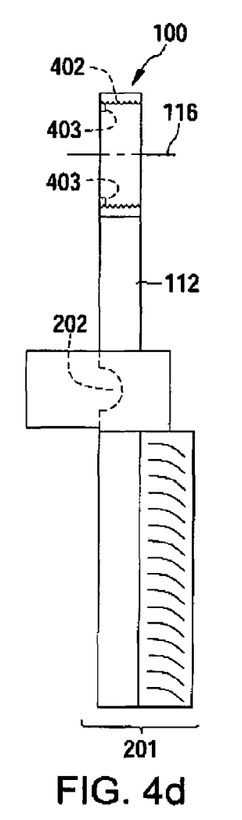
FIG. 4d illustrates a right side view.
Figure 5A:
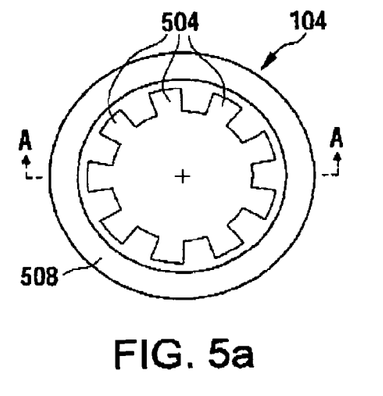
FIG. 5a illustrates a top view of an upper screw lock.
Figure 5B:
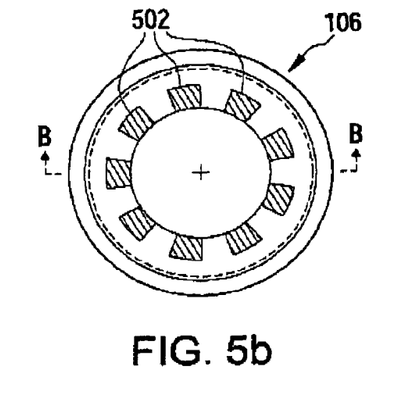
FIG. 5b illustrates a top view of a lower screw lock.
Figure 5C:
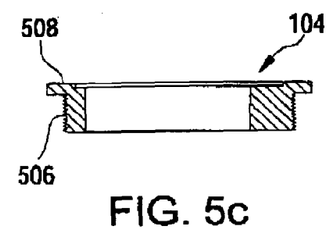
FIG. 5c illustrates a section taken along the upper screw lock in FIG. 5a at A—A.
Figure 5D:
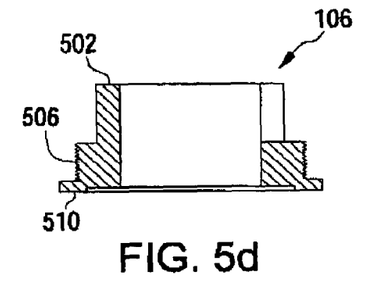
FIG. 5d illustrates a section taken along the lower screw lock in FIG. 5b at B—B.
Figure 5E:
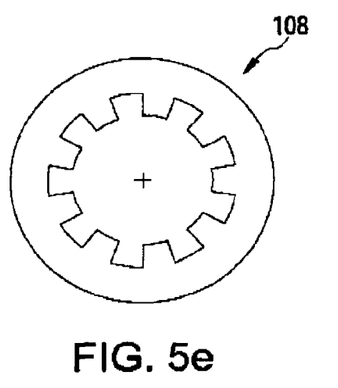
FIG. 5e illustrates a top view of a lubed spline washer.
Figure 5F:
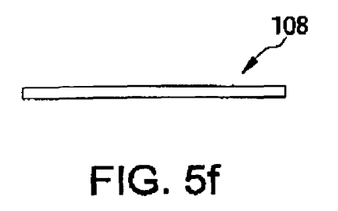
FIG. 5f illustrates an edge view of the spline washer of FIG. 5e.

FIG. 4 illustrate a lower handle assembly according to an embodiment of the invention. In particular, FIG. 4a illustrates a left side view, FIG. 4b illustrates a top view, FIG. 4c illustrates three sections taken along the handle in FIG. 4b at A—A, B—B, and C—C, and FIG. 4d illustrates a right side view.

FIG. 4 shows lower handle 112 in detail. As shown in FIGS. 4b and 4d, screw threads 402 preferably engage the lower handle 112 with the lower screw lock 106. Lower locking force reaction bushing 403 will now be explained along with the locking force reaction bushing 303 of FIG. 3.

A force load path preferably goes through the upper handle threads, through upper handle bushing 303, through the spline washer 108, through the lower handle bushing 403, through the lower handle threads, through the screw locks, through the drive, and back to the upper handle threads. If the handle locking bushings 303 and 403 were allowed to contact each other directly, turning one handle to tighten could turn the other handle to loosen. Therefore, a separating spline washer 108 preferably is inserted between them. The washer 108 preferably is splined to the locking clutch drive 102.

FIG. 5 illustrate views of screw locks and spline washer according to an embodiment of the invention. In particular, FIG. 5a illustrates a top view of an upper screw lock, FIG. 5b illustrates a top view of a lower screw lock, FIG. 5c illustrates a section taken along the upper screw lock in FIG. 5a at A—A, FIG. 5d illustrates a section taken along the lower screw lock in FIG. 5b at B—B, FIG. 5e illustrates a top view of a lubed spline washer, and FIG. 5f illustrates an edge view of the spline washer of FIG. 5e.

FIG. 5 shows the upper 104 and lower 106 screw locks and the lubed spline washer 108 in closer detail. In particular, the splines 502 of the lower screw lock 106 are illustrated in FIGS. 5b and 5d, and the spline passages 504 of the upper screw lock 104 are shown in FIG. 5a. FIG. 5c and FIG. 5d show the locking/unlocking screw threads 506 of the screw locks, which engage the corresponding threads of the handles 110 and 112.

High friction, low wear surfaces 508 and 510 of the upper and lower screw locks 104 and 106, respectively, as also illustrated. These surfaces contact the locking clutch drive 102 as mentioned above with respect to FIG. 1a.

Several surfaces of the screw locks 104 and 106 are dry lubricated, as indicated in FIGS. 5a–5d. Further, all the surfaces of the spline washer 108 are dry lubricated, as indicated.

FIG. 6 illustrate views of a locking clutch according to an embodiment of the invention. In particular, FIG. 6a illustrates a top view of an upper clutch, FIG. 6b illustrates a top view of a lower clutch, FIG. 6c illustrates a bottom view of the upper clutch of FIG. 6a, FIG. 6d illustrates a bottom view of the lower clutch in FIG. 6b, FIG. 6e illustrates a section of the upper clutch of FIG. 6c taken along B—B, and FIG. 6f illustrates a section of the lower clutch of FIG. 6b taken along A—A.

As mentioned above, the locking clutch drive 102 is divided into two parts, an upper clutch 602 and a lower clutch 604, as shown. The lower clutch 604 has threaded splines 606 which extend into spline passageways in the upper clutch 602.

The upper clutch 602 has a screw passageway 608 for receiving the assembly screw 114, including a screw head seat 610 against which the head of the screw 114 rests when engaged in threaded splines 606.

Figure 6A:
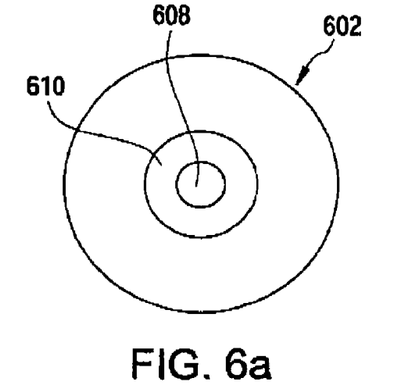
FIG. 6a illustrates a top view of an upper clutch.
Figure 6B:
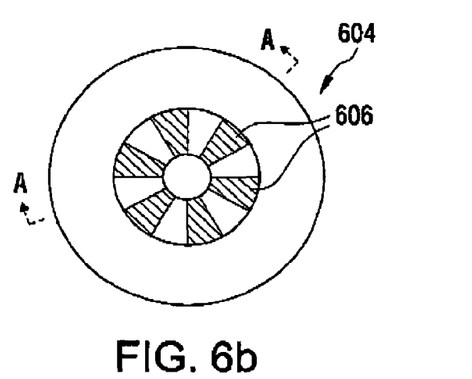
FIG. 6b illustrates a top view of a lower clutch.
Figure 6C:
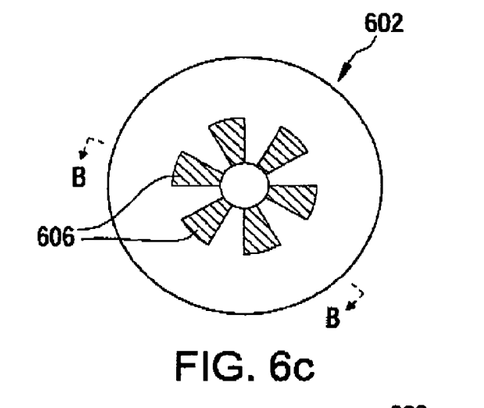
FIG. 6c illustrates a bottom view of the upper clutch of FIG. 6a, FIG. 6d illustrates a bottom view of the lower clutch in FIG. 6b.
Figure 6D:
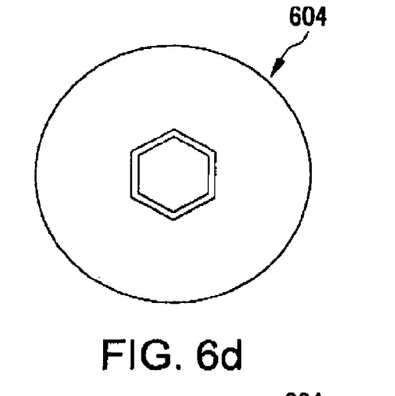
Figure 6E:
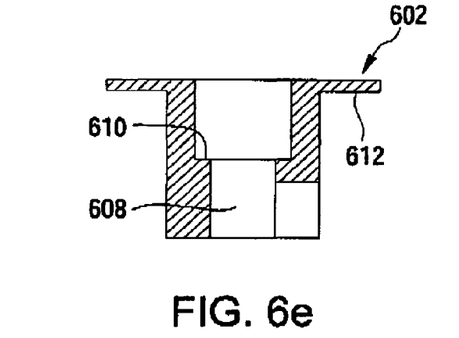
FIG. 6e illustrates a section of the upper clutch of FIG. 6c taken along B—B.
Figure 6F:
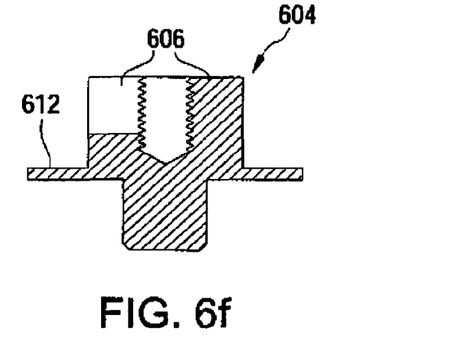
FIG. 6f illustrates a section of the lower clutch of FIG. 6b taken along A—A.

The clutch wear surfaces 612 on the upper 602 and lower 604 clutch are illustrated in the sectional views FIG. 6e and FIG. 6f.

The operation of an exemplary embodiment of a screw locking wrench according to the invention will now be described. First, the case in which the operator is tightening a fastener, i.e., clockwise rotation, is considered. As shown in FIG. 2, for example, the preload spring forces the upper handle 110 in the clockwise direction and the lower 112 handle in the opposite direction, counter-clockwise, thereby keeping the upper 104 and lower 106 screw locks in intimate contact with the locking clutch drive 102. The arrows in FIGS. 2b and 2c show the direction of locking caused by the geometry of the system and by the preload spring.

Therefore, to initiate clockwise rotation of the locking clutch drive 102, the operator applies a clockwise torque to the upper handle 110, as seen in FIG. 2c. This force in the clockwise direction drives the upper 104 and lower 106 screw locks against the locking clutch drive 102, instantaneously locking the upper handle 110, the upper 104 and lower 106 screw locks, and the locking clutch drive 102 into a single unit which rotates the fastener clockwise. The operator experiences negligible backlash/elastic deformation and the fastener is tightened.

The system is self-locking, that is, the greater the applied torque, the harder the system locks up. After some arbitrary angle of rotation, the operator can unlock the device (as will be explained below), rotate it back to the original starting position, relock it, and drive it again. This can be repeated over and over until the cumulative rotation of the fastener and/or its preload is sufficient.

Referring back to FIG. 2c, for a clockwise drive, unlocking occurs when the operator applies force on the upper 110 and lower 112 handles opposite to the arrows. Advantageously, this can be accomplished when holding the handles 110 and 112 in one hand by a simple, one-handed rotation of the wrist. This unlocking action compresses the preload spring, drives the upper 104 and lower 106 screw locks away from intimate contact with the locking clutch drive 102, and the upper 110 and lower 112 handles are free to rotate counter clockwise. Relaxing the wrist action allows the preload spring to bias the upper 104 and lower 106 screw locks against the locking clutch drive 102, and the operator is ready for another tightening increment. If screw locking shows signs of slipping, the operator may squeeze the upper 110 and lower 112 handles together while applying torque, thereby assisting the locking process.

The case in which the operator is attempting to loosen a fastener by rotating it counter clockwise will now be described. In this instance, the operator applies counter clockwise torque to the lower handle 112, shown in FIG. 2c. Thus, the system locks up against counter clockwise rotation, and the fastener is loosened. (This of course assumes a normally threaded fastener—alternately, a reverse threaded fastener would be tightened in a counter clockwise direction).

Unlocking is done by a simple turn of the wrist just as it was done for the clockwise case, and the operator is ready for the next incremental counter clockwise rotation.

Some additional operational details will now be discussed, and some details on the internal workings of the system will now be described. The upper 104 and lower 106 screw locks preferably are threaded into the upper 110 and lower 112 handles, respectively. The upper 104 and lower 106 screw locks preferably are splined together so that they cannot rotate with respect to each other. A lubed spline washer 108 may be positioned between them, so it and the upper 104 and lower 106 screw locks rotate together as a unit. However, the screw locks 104 and 106 are able to translate axially, and to lock or unlock as the case may be. The preload spring urges the upper 110 and lower 112 handles with equal and opposite force with respect to the upper 104 and lower 106 screw locks and these, accordingly, translate apart until they contact the surfaces of the locking clutch drive 102 and come to rest. When the operator drives the system in either a clockwise or a counter clockwise direction, the mechanical advantage of the screw threads provides the self-locking performance of the device.

The lubed spline washer 108 preferably provides a low contact stress, lubed reaction platform for the reactive forces of both the upper 110 and lower 112 handles. Splining the washer 108 ensures that, for example, a clockwise motion of the upper handle 110 cannot rotate the lower handle 112 with it and, thereby unlock the lower 112 while the upper 110 is being locked. An analogous case holds for counter clockwise motion.

The locking clutch drive 102 preferably is split into two splined halves 602 and 604 (see FIG. 6), and the entire system can be assembled with a single, simple common machine assembly screw 114, as has been illustrated.

Locking analysis will now be presented. That is, screw locking will now be discussed from an analytical point of view to provide some measure of insight as to how and why it works.

Figure 7A:
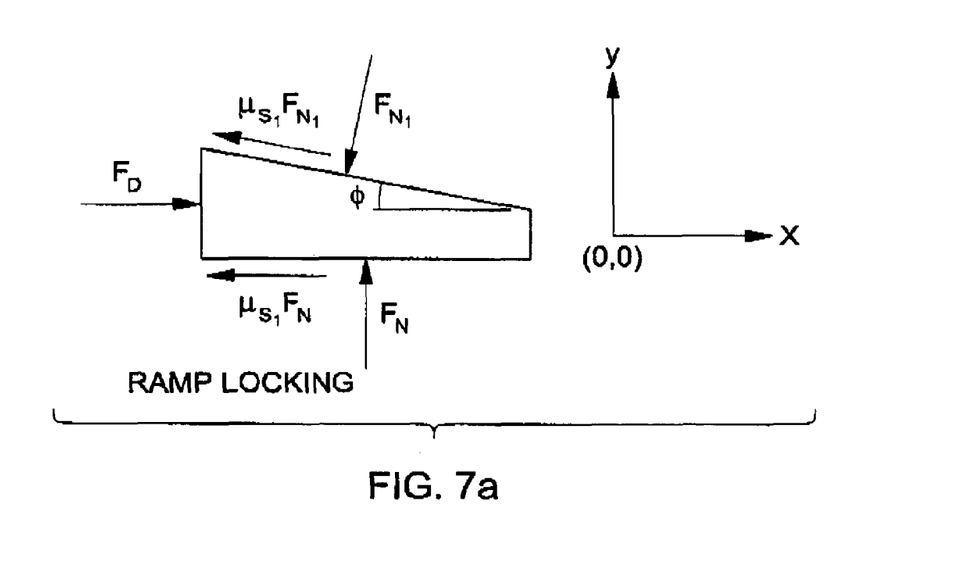
FIG. 7a illustrates ramp locking.
Figure 7B:
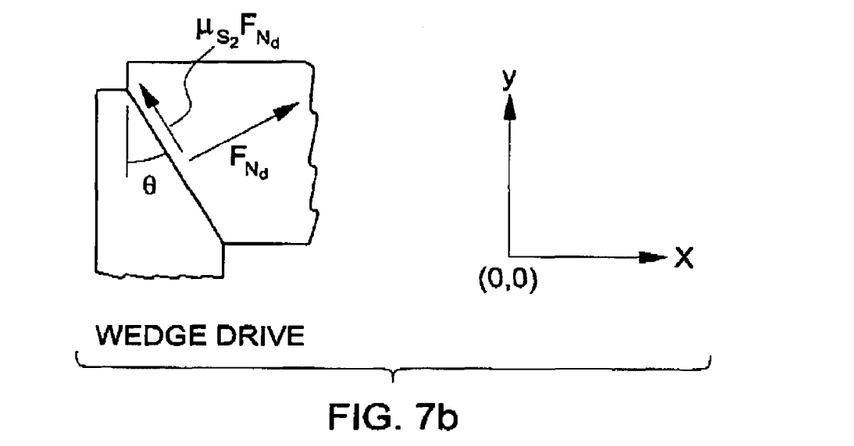
FIG. 7b illustrates wedge drive.

FIGS. 7a and 7b illustrate ramp locking and wedge drive, respectively. In particular, FIG. 7a illustrates the wedge action that may be obtained by rotating a threaded handle against its corresponding threaded screw lock.

Where:

$F_D$=(drive force) Torque applied to the Handle divided by the thread radius of its Screw Lock $F_N$=Normal force between Handle and Lubed Spline Washer $R_1$=Thread radius of Screw Lock $R_2$=Effective contact radius of Lubed Spline Washer bushing $F_{N1}$=Normal force on thread contact surfaces (Handle/Screw Lock)

$\phi$=Screw thread angle $\mu_{S1}$=Static coefficient of friction for lubed contact surfaces $\mu_{S2}$=Static coefficient of friction for Locking Clutch Drive/Screw Lock interface We begin with $$\sum F_x = 0 \qquad (1)$$

Which leads to $$F_D = F_{N1}\mu_{S1}\frac{R_1}{R_2} + F_{N1}\mu_{S1}\cos\phi + F_{N1}\mu_{S1}\sin\phi \qquad (2)$$

We also know $$\sum F_Y = 0 \qquad (3)$$

Which, in turn, leads to $$F_N = F_{N1}\cos\theta - F_{N1}\mu_{S1}\sin\phi \qquad (4)$$

$$\text{Or } F_{N1} = \frac{F_N}{(\cos\phi - \sin\phi)} \qquad (5)$$

Simplifying eq. (2) above, we have $$F_D = F_N\mu_{S1}\left(\frac{R_1}{R_2}\right) + F_{N1}\mu_{S1}(\cos\phi + \sin\phi) \qquad (6)$$

Combining eqs. (5) and (6), we obtain $$F_D = F_N\mu_{S1}\left\{\frac{R_1}{R_2} + \frac{[\cos\phi + \sin\phi]}{[\cos\phi - \mu_{S1}\sin\phi]}\right\} \qquad (7)$$

By construction: $\frac{R_1}{R_2} \leq 1$, $[\cos\phi - \sin\phi] \geq 1$ $\qquad (8)$ So: $2F_N\mu_{S2} > F_D$ $\qquad (9)$ Resulting in: $\mu_{S2} \geq 0.5\mu_{S1}\left\{\frac{R_1}{R_2} + \frac{[\cos\phi + \sin\phi]}{[\cos\phi - \mu_{S1}\sin\phi]}\right\}$ $\qquad (10)$ We will now perform some calculations required for screw-locking ($\mu_{S2}$) using representative screw angles (pitch/diameter/angle) and dry lube coefficients of friction ($\mu_{S1}$).

TABLE 1

| | | |
|---|---|---|
| $\phi = 0$ deg. | $\mu_{s1} = 0.1$ | $\mu_{s1} = 0.1$ |
| | $K = 1 + 1$ | $K = 1 + 1$ |
| | $\mu_{s2} \geq 0.1$ | $\mu_{s2} = 0.15$ |
| $\phi = 1.215672$ deg. | $\mu_{s1} = 0.1$ | $\mu_{s1} = 0.15$ |
| (1.25 in. dia/12 pitch) | $K = 1 + 1.000407$ | $K = 1 + 1.024482$ |
| | $\mu_{s2} \geq 0.1000204$ | $\mu_{s2} \geq 0.1518362$ |
| $\phi = 3.642647$ deg. | $\mu_{s1} = 0.1$ | $\mu_{s1} = 0.15$ |
| (1.25 in. dia/4 pitch) | $K = 1 + 1.070477$ | $K = 1 + 1.073917$ |
| | $\mu_{s2} \geq 0.1035238$ | $\mu_{s2} \geq 0.1555438$ |

For these exemplary embodiments, we conclude that screw locking will occur as long as $\mu_{S2} > \mu_{S1}$ by (in the worst case shown for 1.25 in. dia/4 pitch screw lock and $\mu_{S1} = 0.15$) of as little as 0.0055436/0.15=0.03695733 or 3.7% above the lube coefficient of friction. With a slight amount of hand squeezing, the system will lock and work even if $\mu_{S2} < \mu_{S1}$.

Locking Release Analysis

The amount of wrist action needed to open/unlock the wrench will now be examined. From the immediately preceding discussion, we are confident that an exemplary Screw Lock Wrench with $\phi=3.642647$ deg., pitch of 4, will work (lock). And, with its relatively large pitch, it will open further with less wrist action than finer threads (higher pitches).

We know that $$\pi 2R_2\tan\phi = \frac{1}{4}\left(\frac{1}{\text{pitch}}\right) \qquad (1)$$

Or, in our case, $$\pi(1.25)\tan\phi = 0.25 \text{ in.} \qquad (2)$$

Resulting in tan $\phi=6.366198(E-2) \leq \mu_{S1} \leq \mu_{S2}$ (Which is satisfactory) $\qquad (3)$ Or $\phi=3.642647$ deg. $\qquad (4)$ We wish a 0.005 in. clearance to make certain the Screw Locks completely release, so:

$$\frac{0.005 \text{ in.}}{0.25 \text{ in.}} = \text{Portion of complete Handle Rotation to provide clearance} \quad (5)$$

$$\frac{0.005 \text{ in.}}{0.25 \text{ in.}} = \frac{1}{50} \text{ of a complete rotation} \quad (6)$$

Which, in turn, results in $\frac{360 \text{ deg.}}{50} = 7.200000$ deg. (7)

Or $\frac{2\pi}{50} = 0.1256637$ rad. (8)

For a 7 in. long Handle, the motion to unlock is 7 in.×0.1256637 rad.=0.8796459 in.<1 in. (9)

which is satisfactory.

Wedge drive analysis will now be examined, considering the merits of using a wedge drive interface between the screw locks and the locking clutch drive (FIG. 7b). We examine various exemplary wedge angles (θ in FIG. 7b), and calculate the improvement in normal force the wedge provides over no wedge by the ratio $$\frac{F_{Nd}}{F_N}.$$

We do this for various representative wedge angles, and various coefficients of friction. As the table, shown below, indicates, a wedge angle will improve things, but not dramatically. One of skill will recognize that a wedge angle is not necessary to make the system work and it does complicate construction a bit.

$$\sum F_Y = 0 \quad (1)$$

$$F_N = F_{Nd} \sin\theta + \mu_{S2} F_{Nd} \cos\theta \quad (2)$$

$$F_{Nd} = \frac{F_N}{(\sin\theta + \mu_{S2}\cos\theta)} \quad (3)$$

TABLE 2

| θ = 10 deg. | $\mu_{s2}$ = 0.10 | $\mu_{s2}$ = 0.15 | $\mu_{s2}$ = 0.20 |
|---|---|---|---|
| | $\frac{F_{Nd}}{F_N}$ = 3.674728 | $\frac{F_{Nd}}{F_N}$ = 3.111685 | $\frac{F_{Nd}}{F_N}$ = 2.698256 |

TABLE 2-continued

| | $\mu_{s2}$ = 0.30 | $\mu_{s2}$ = 0.40 | $\mu_{s2}$ = 0.50 |
|---|---|---|---|
| | $\frac{F_{Nd}}{F_N}$ = 2.131785 | $\frac{F_{Nd}}{F_N}$ = 1.761893 | $\frac{F_{Nd}}{F_N}$ = 1.501384 |
| θ = 15 deg. | $\mu_{s2}$ = 0.10 | $\mu_{s2}$ = 0.15 | $\mu_{s2}$ = 0.20 |
| | $\frac{F_{Nd}}{F_N}$ = 3.554116 | $\frac{F_{Nd}}{F_N}$ = 2.477038 | $\frac{F_{Nd}}{F_N}$ = 2.212369 |
| | $\mu_{s2}$ = 0.30 | $\mu_{s2}$ = 0.40 | $\mu_{s2}$ = 0.50 |
| | $\frac{F_{Nd}}{F_N}$ = 1.822832 | $\frac{F_{Nd}}{F_N}$ = 1.549933 | $\frac{F_{Nd}}{F_N}$ = 1.348105 |
| θ = 30 deg. | $\mu_{s2}$ = 0.10 | $\mu_{s2}$ = 0.15 | $\mu_{s2}$ = 0.20 |
| | $\frac{F_{Nd}}{F_N}$ = 1.704732 | $\frac{F_{Nd}}{F_N}$ = 1.587544 | $\frac{F_{Nd}}{F_N}$ = 1.071797 |
| | $\mu_{s2}$ = 0.30 | $\mu_{s2}$ = 0.40 | $\mu_{s2}$ = 0.50 |
| | $\frac{F_{Nd}}{F_N}$ = 1.316123 | $\frac{F_{Nd}}{F_N}$ = 1.181460 | $\frac{F_{Nd}}{F_N}$ = 1.071797 |

Some advantages of the above described invention over known tools will now be mentioned. One-way ratchet wrenches have a backlash/dead zone region and are limited regarding operation in small spaces. Also, they require a separate switching system for changing direction. A screw locking wrench according to an embodiment of the invention has negligible backlash/dead zone region and a totally one-handed operation including wrist switching of direction.

The one-way sprag ratchetless wrenches reduce the backlash/dead zone region, however they have load bearing limitations, are relatively complicated in their sprag preload/switching schemes and construction, and require reorienting the wrench to change direction. A screw locking wrench according to an embodiment of the invention has negligible backlash/dead zone region, an essentially negligible load bearing limitation, a preload scheme that is much simpler than sprag wrenches, a totally one-handed operation, including wrist switching, which is much simpler than those of sprag wrenches, and much simpler construction (fewer parts) overall.

A screw locking wrench according to an embodiment of the invention should be less expensive than either one-way ratchet wrenches or one-way sprag wrenches. Also, it should be more rugged and reliable for space operations.

Although a number of equivalent components may have been mentioned herein which could be used in place of the components illustrated and described with reference to the preferred embodiment(s), this is not meant to be an exhaustive treatment of all the possible equivalents, nor to limit the invention defined by the claims to any particular equivalent or combination thereof. A person skilled in the art would realize that there may be other equivalent components presently known, or to be developed, which could be used within the spirit and scope of the invention defined by the claims.

Yet another embodiment of the invention will now be considered relating to a wedge interface between screw locks and locking clutch drive. The screw locking arrangement shown in FIG. 2 can be reversed. FIG. 2c can be flipped about its neutral axis (the C—C section line in FIG. 2b) so counterclockwise drive occurs off the upper handle (as opposed to clockwise drive now) and clockwise drive occurs off the lower handle (as opposed to counterclockwise drive now).

It should be clear to a person skilled in the art that, as with the two element embodiment, micro stepping, either active or passive, can be accomplished with the three element embodiment in a similar manner, by controlling the frictional force of the elements during movements, and therefore, further explanation is not deemed necessary.

It will be understood that the above described embodiments of the present invention are susceptible to various modifications, changes, and adaptations, and the same are intended to be comprehended within the meaning and range of equivalents of the appended claims.

It will be apparent to one skilled in the art that the manner of making and using the claimed invention has been adequately disclosed in the above-written description of the preferred embodiment taken together with the drawings.

What is claimed is:

1. A tool, comprising:
    a first handle and a second handle, each handle extending from a gripping end portion to a working end portion, the first handle having first screw threads disposed circumferentially about an inner portion of a first through-hole at the working end portion thereof, the second handle having second screw threads disposed circumferentially about an inner portion of a second through-hole at the working end portion thereof, the first and second respective through-holes being disposed concentrically about a common axis of the working end portions;
    a first screw lock and a second screw lock disposed substantially concentrically with the first and second respective through-holes, the first screw lock having a plurality of locking/unlocking screw threads for engaging the first screw threads of the first handle, the second screw lock having a plurality of locking/unlocking screw threads for engaging the second screw threads of the second handle; and
    a locking clutch drive, disposed substantially concentrically with the first and second respective through-holes, which engages the first screw lock and the second screw lock;
    wherein the first handle and the second handle are selectively operable at their gripping end portions by a user using a single hand to activate the first and second screw locks to lock the locking clutch drive for rotation about the common axis of their working end portions.

2. The tool according to claim 1, further comprising a preload spring disposed between the first and second handles between the gripping end portions and the working end portions;
    wherein the first and second handles each have a preload spring pocket for receiving the preload spring therein;
    wherein the preload spring applies a substantially equal and opposite force to the first and second handles;
    wherein the force applied to the first and second handles urges the first and second screw locks into contact with the locking clutch drive by urging the respective first and second screw threads of the first and second handles against the plurality of locking/unlocking screw threads of the first and second screw locks, respectively, so that the first and second screw locks are urged into contact with the locking clutch drive.

3. The tool according to claim 1, further comprising a drive member disposed on the locking clutch drive for providing output from the wrench to a fastener.

4. The tool according to claim 1, wherein the first and second screw locks are threaded into the first and second screw threads of the first and second handles, respectively.

5. The tool according to claim 1, wherein the first screw lock has a plurality of spline passages and the second screw lock has a plurality of splines, the splines of the second screw lock selectively fitting into the spline passages of the first screw lock so that the first and second screw locks cannot rotate with respect to each other.

6. The tool according to claim 5, further comprising a spline washer disposed coaxially with and between the first screw lock and the second screw lock, for preventing the first handle and the second handle from rubbing together;
    wherein the first screw lock, the second screw lock and the spline washer rotate together as a unit; and
    wherein the first screw lock and the second screw lock can move axially with respect to each other.

7. The tool according to claim 1, wherein the locking clutch drive comprises:
    a first clutch which engages the first screw lock and is disposed coaxially therewith; and
    a second clutch which engages the second screw lock and is disposed coaxially therewith.

8. The tool according to claim 7, wherein the locking clutch drive comprises a drive member disposed on the second clutch coaxially with the second clutch.

9. The tool according to claim 1, wherein the locking clutch drive comprises a first clutch which engages the first screw lock and is disposed coaxially therewith, and a second clutch which engages the second screw lock and is disposed coaxially therewith; and
    wherein the tool further comprises:
    an assembly screw having assembly screw threads;
    wherein the first clutch has an axially disposed screw passageway for receiving the assembly screw therethrough;
    wherein the second clutch has threads which engage the assembly screw threads of the assembly screw; and
    wherein the assembly screw extends axially through the first clutch and into the second clutch so that the assembly screw threads of the assembly screw engage with the threads of the second clutch.

10. The tool according to claim 9, wherein the first clutch has spline passages and the second clutch has splines that fit selectively into the spline passages of the first clutch so that the first clutch and the second clutch cannot rotate with respect to each other.

11. The tool according to claim 10, wherein the second clutch threads which engage the assembly screw threads of the assembly screw are disposed on the splines of the second clutch.

12. The tool according to claim 9, wherein the assembly screw further comprises a screw head;
    wherein the first clutch has an axially disposed screw head seat for seating the screw head of the assembly screw; and wherein the assembly screw extends axially through the first clutch and into the second clutch so that the screw head of the assembly screw is seated on the screw head seat.

13. The tool according to claim 1, further comprising a spline washer disposed coaxially with and between the first screw lock and the second screw lock, for preventing the first handle and the second handle from rubbing together;

wherein the first handle comprises a first locking force reaction bushing and the second handle comprises a second locking force reaction bushing;

wherein the force reaction bushing of the first handle and the force reaction bushing of the second handle are disposed coaxially with respect to each other and with respect to the spline washer; and wherein the reaction bushings are disposed to contact opposite sides of the spline washer, thereby sandwiching the spline washer therebetween and allowing the first handle and the second handle to rotate independently from each other with respect to the common axis of their working end portions.

14. The tool according to claim 13, wherein the locking clutch drive has a central cylindrical section and first and second annular sections disposed coaxially at opposite ends of the cylindrical section;

wherein each of the first and second screw locks have a respective cylindrical section disposed around an outside surface of the locking clutch drive central cylindrical section in close proximity thereto, and a respective annular section disposed to extend in close proximity to a respective annular section of the locking clutch drive;

wherein the respective annular sections of the first and second screw locks, which are disposed to extend in close proximity to a respective annular section of the locking clutch drive, each include a respective high friction, low wear surface portion for contact with a respective clutch wear surface of the locking clutch drive annular sections;

wherein the spline washer is disposed around the outside surface of the cylindrical section of the locking clutch drive between the first and second screw locks;

wherein all surfaces of the spline washer are dry lubricated; and wherein the surfaces of the first and second screw locks which are in close proximity to the locking clutch drive central cylindrical section are dry lubricated.

15. The tool according to claim 1, wherein the first handle and the second handle gripping end portions each have a cross section substantially in the shape of a circle with a triangular extension;

wherein the handles are disposed so that the triangular extension of the first handle and the triangular extension of the second handle are disposed to have corresponding sides which extend in opposite directions, such that when the first handle and the second handle are rotated in opposite directions with respect to the common axis of their working end portions, respective opposing surfaces of the respective triangular extensions move in close proximity in opposite directions.

16. The tool according to claim 1, wherein the first screw lock and the second screw lock engage the locking clutch drive at respective surfaces thereof; and wherein the respective surfaces of engagement of the first screw lock, the second screw lock, and the locking clutch drive comprise high friction, low wear surface.

\* \* \* \* \*